(12) United States Patent
Pitkin et al.

(10) Patent No.: US 10,564,367 B1
(45) Date of Patent: Feb. 18, 2020

(54) MT CONNECTOR ASSEMBLY AND METHOD THEREFOR

(71) Applicant: BENCHMARK ELECTRONICS, INC., Scottsdale, AZ (US)

(72) Inventors: Kevin Jon Pitkin, Eagan, MN (US); Peter Everett Brooks, Rochester, MN (US); Mark Braithwaite, Scottsdale, AZ (US)

(73) Assignee: BENCHMARK ELECTRONICS, INC., Tempe, AZ (US)

( * ) Notice: Subject to any disclaimer, the term of this patent is extended or adjusted under 35 U.S.C. 154(b) by 0 days.

(21) Appl. No.: 16/163,991

(22) Filed: Oct. 18, 2018

(51) Int. Cl.
*G02B 6/38* (2006.01)

(52) U.S. Cl.
CPC ......... *G02B 6/3882* (2013.01); *G02B 6/3834* (2013.01)

(58) Field of Classification Search
None
See application file for complete search history.

(56) References Cited

U.S. PATENT DOCUMENTS

| | | | | |
|---|---|---|---|---|
| 6,149,313 A * | 11/2000 | Giebel | ............ | G02B 6/3825 385/53 |
| 7,191,586 B2 * | 3/2007 | Yamamoto | ............ | A44C 5/105 59/80 |
| 7,833,068 B2 * | 11/2010 | Bright | ............ | H01R 13/502 439/733.1 |
| 10,162,126 B2 * | 12/2018 | Elenbaas | ............ | G02B 6/3882 |
| 10,215,926 B2 * | 2/2019 | Ott | ............ | G02B 6/3885 |
| 2008/0273855 A1 * | 11/2008 | Bradley | ............ | G02B 6/3849 385/139 |
| 2011/0262075 A1 * | 10/2011 | Beatty | ............ | G02B 6/3882 385/60 |
| 2013/0299076 A1 * | 11/2013 | Bradley | ............ | G02B 6/3851 156/249 |
| 2015/0198774 A1 * | 7/2015 | Lin | ............ | G02B 6/3886 385/57 |
| 2015/0247979 A1 * | 9/2015 | Richmond | ............ | G02B 6/38 385/83 |
| 2016/0085045 A1 * | 3/2016 | Hill | ............ | G02B 6/3849 385/78 |
| 2017/0023752 A1 * | 1/2017 | Isenhour | ............ | G02B 6/4293 |
| 2017/0192181 A1 * | 7/2017 | Barwicz | ............ | G02B 6/3893 |
| 2019/0137700 A1 * | 5/2019 | Takano | ............ | G02B 6/3887 |
| 2019/0154924 A1 * | 5/2019 | Chang | ............ | G02B 6/3831 |

* cited by examiner

*Primary Examiner* — Tina M Wong
(74) *Attorney, Agent, or Firm* — Weiss & Moy, P.C.; Jeffrey D. Moy

(57) ABSTRACT

A fiber optic connector assembly has an MT connector. The MT connector has a housing. A first slot is formed in a front surface of the housing. The first slot extends across a width of the front surface of the housing and partially down a length of the housing. A pair of slots is formed in a rear surface of the housing. The pair of slots extends across a width of the rear surface of the housing and partially down the length of the housing. An aperture is formed through a side surface of the housing and between the pair of slots. The aperture extends completely through the housing. An opening is formed in a central area of the rear surface of the housing and in communication with the aperture. A channel is formed between the first slot and the aperture connecting the first slot to the aperture. At least one securing pin is formed within the first slot.

19 Claims, 4 Drawing Sheets

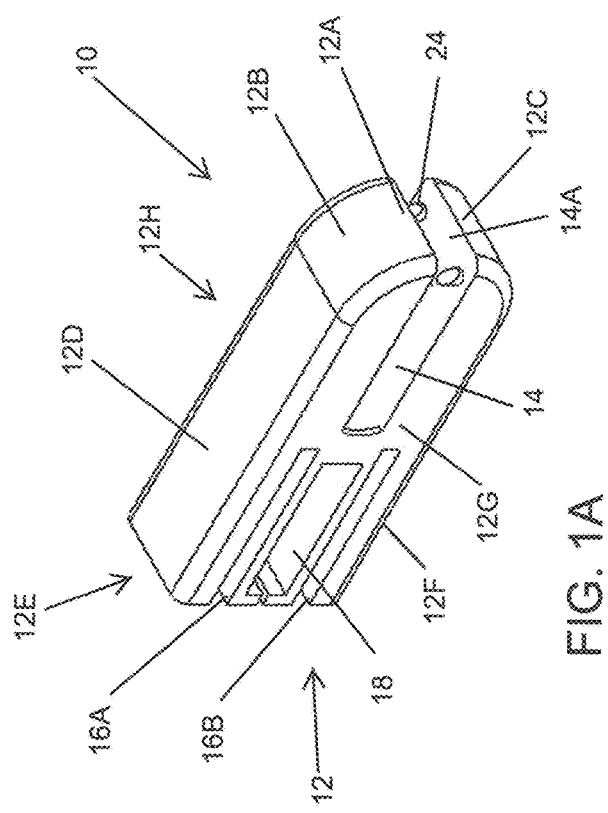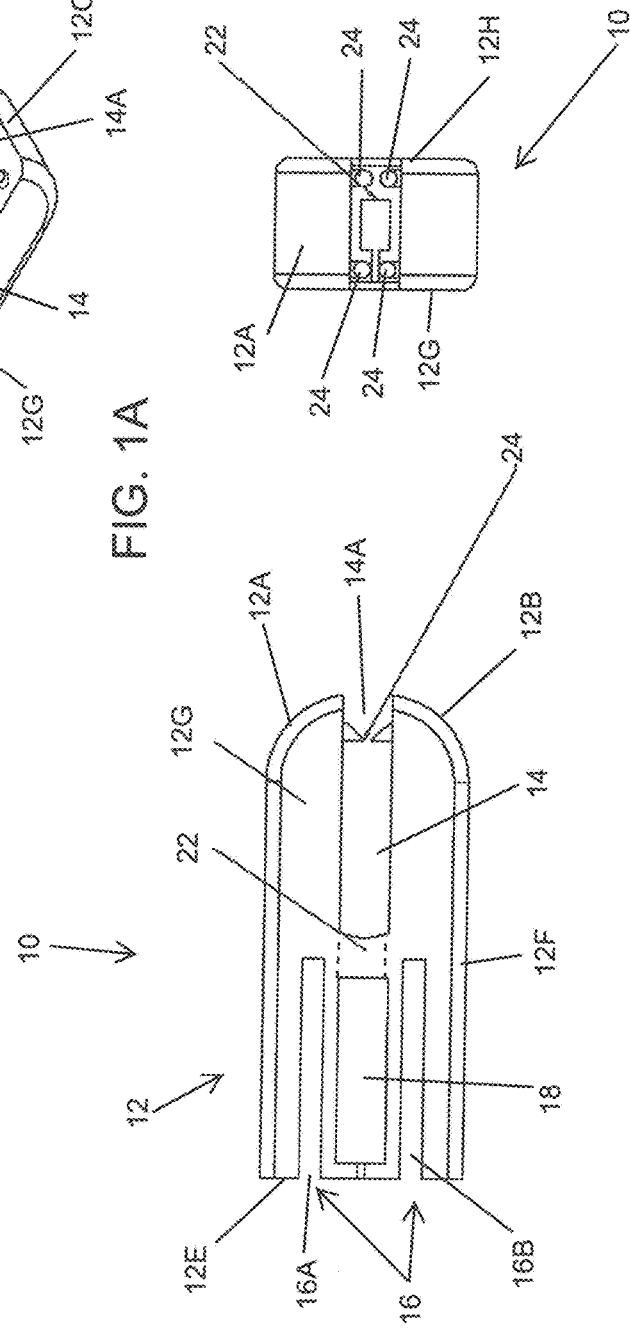
FIG. 1A
FIG. 1C
FIG. 1B

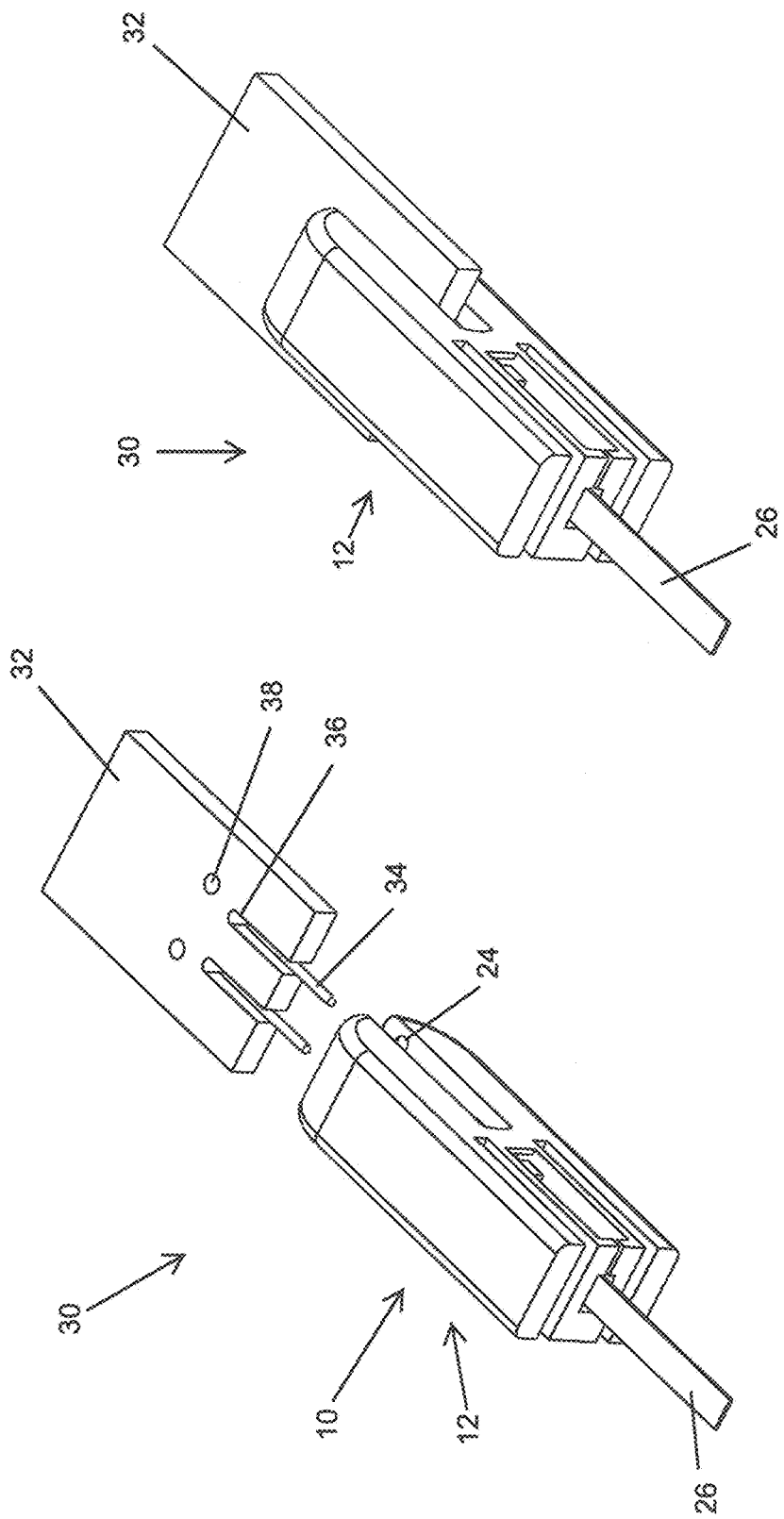

MT CONNECTOR ASSEMBLY AND METHOD THEREFOR

TECHNICAL FIELD

The present application relates generally to the technical field of fiber optic connectors, and more specifically, to the technical field of an MT connector assembly to secure a fiber optic ribbon to an Optical Waveguide Printed Circuit Board (OWPCB).

BACKGROUND

A fiber optic communication system may be comprised of three basic components: an optical transmitter, a fiber optic cable and an optical receiver. The optical transmitter may convert an electrical signal to optical signal. The optical signals may be carried by the fiber optic cable from the optical transmitter to the optical receiver. The optical receiver may convert the optical signal back to an electrical signal. Fiber optic cables have generally replaced metal communication cables due to the speed and bandwidth of data transmission over the fiber optic cable.

Optical signal carriers such as polymer waveguides, embedded fibers and the like have been embedded into Printed Circuit Boards (PCBs) as a way to increase data transmission and speed within the PCB. The optical fibers or waveguides are generally embedded within or laminated on the surface of the PCB. These PCBs may be referred to as an optical PCBs even though they may still contain electrical connectors and components. The use of optical pathways may enable much higher data rates to electronic hardware coupled to or provided on that PCB.

Fiber optic connectors may be used to terminate optical fiber cables and to facilitate connection of the optical fiber cables to other optical fiber cables, other optical fiber transmission devices or to optical PCBs. A typical fiber optic connector may include a ferrule which mounts and centers an optical fiber or fibers within the connector. A ferrule holder or other housing component of the connector may be used to embrace the ferrule.

One type of fiber optic array connector system may be known as an MT style connector. MT may stand for mechanical transfer. In the MT style connector, a multi-fiber ferrule may be used in which fiber alignment is dependent on the eccentricity and pitch of the fiber and alignment pin holes. MT style connectors use a gripping mechanism to secure the multi-fiber ferrule to another device.

A fiber optic connector should retain mutual alignment of respective fiber cores in a repeatable separable interconnect. The fiber optic connector should maintain performance characteristics over multiple matings and unmatings under various environmental conditions. Unfortunately, poor fiber optic connectors may cause misalignment of the respective fiber cores. This may cause optical transmission losses within the fiber optic communication system.

Establishing connectivity between the fiber optic connector and the optical PCB has been problematic. Many MT style connectors that engage the optical PCB may not form reliable connections after repetitive use. Many MT style connectors that engage the optical PCB may allow for small gaps to form which may cause optical transmission losses. The gaps may be formed due to reliable connections after repetitive use, due to shaking and/or vibrations to the optical PCB or due to other issues.

Therefore, it would be desirable to provide a system and method that overcomes the above. The system and method would create an MT style termination to a hybrid electro/optical PCB and hold it reliably to the hybrid electro/optical PCB thereby preventing small gaps to form between the MT termination and the hybrid electro/optical PCB.

SUMMARY

In accordance with one embodiment, a fiber optic connector assembly is disclosed. The fiber optic connector assembly has an MT connector. The MT connector has a housing. A first slot is formed in a front surface of the housing. The first slot extends across a width of the front surface of the housing and partially down a length of the housing. A pair of slots is formed in a rear surface of the housing. The pair of slots extends across a width of the rear surface of the housing and partially down the length of the housing. An aperture is formed through a side surface of the housing and between the pair of slots. The aperture extends completely through the housing. An opening is formed in a central area of the rear surface of the housing and in communication with the aperture. A channel is formed between the first slot and the aperture connecting the first slot to the aperture. At least one securing pin is formed within the first slot.

In accordance with one embodiment, a fiber optic connector assembly is disclosed. The fiber optic connector assembly has an MT connector. The MT connector has a housing. A first slot is formed in a front surface of the housing. The first slot extending across a width of the front surface of the housing and extends midway down the length of the housing and is planar with a top surface of the housing. A pair of slots is formed in a rear surface of the housing. The pair of slots extending across a width of the rear surface of the housing and partially down the length of the housing. An aperture is formed through a side surface of the housing and between the pair of slots. The aperture extends completely through the housing. An opening is formed in a central area of the rear surface and in communication with the aperture. A channel is formed between the first slot and the aperture connecting the first slot to the aperture. A first pair of securing pins extends down from a top surface of the first slot. A second pair of securing pins extend up from a bottom surface of the first slot, wherein the first pair of securing pins and the second pair of securing pins are aligned such that a corresponding securing pin of the second pair of securing pins is directly below a corresponding securing pin of the first pair of securing pins.

In accordance with one embodiment, a fiber optic connector assembly is disclosed. The fiber optic connector assembly fiber optic connector assembly has an MT connector. The MT connector has a housing. A first slot is formed in a front surface of the housing. The first slot extends across a width of the front surface of the housing and extends midway down the length of the housing and is planar with a top surface of the housing. A pair of slots is formed in a rear surface of the housing. The pair of slots extends across a width of the rear surface of the housing and partially down the length of the housing, wherein the pair of slots extend midway down the length of the housing and are planar to a top surface of the housing. A first of the pair of slots is formed in an upper area of the rear surface of the housing and a second of the pair of slots formed in a lower area of the rear surface housing. An aperture is formed through a side surface of the housing and between the pair of slots. The aperture extends completely through the housing. An opening is formed in a central area of the rear surface of the housing and in communication with the aperture. A channel is formed between the first slot and the aperture connecting the first slot to the aperture. A coil is positioned within the first slot. The coil has a diameter larger than a perimeter of the opening. A first pair of securing pins extends down from a top surface of the first slot. A second pair of securing pins extends up from a bottom surface of the first slot, wherein the first pair of securing pins and the second pair of securing pins are aligned such that a corresponding securing pin of the second pair of securing pins is directly below a corresponding securing pin of the first pair of securing pins.

BRIEF DESCRIPTION OF THE DRAWINGS

The present application is further detailed with respect to the following drawings. These figures are not intended to limit the scope of the present application but rather illustrate certain attributes thereof. The same reference numbers will be used throughout the drawings to refer to the same or like parts.

FIG. 1A is an elevated perspective view of an exemplary MT connector used in the MT connector assembly in accordance with one aspect of the present application;

FIG. 1B is an elevated side view of the exemplary MT connector used in the MT connector assembly in accordance with one aspect of the present application;

FIG. 1C is a front view of the exemplary MT connector used in the MT connector assembly in accordance with one aspect of the present application;

FIG. 2A is an elevated perspective view of the MT connector assembly with the MT connector disconnected to the Optical Waveguide Printed Circuit Board (OWPCB) in accordance with one aspect of the present application;

FIG. 2B is an elevated perspective view of the MT connector assembly with the MT connector connected to the OWPCB in accordance with one aspect of the present application;

DESCRIPTION OF THE APPLICATION

Figure 3:
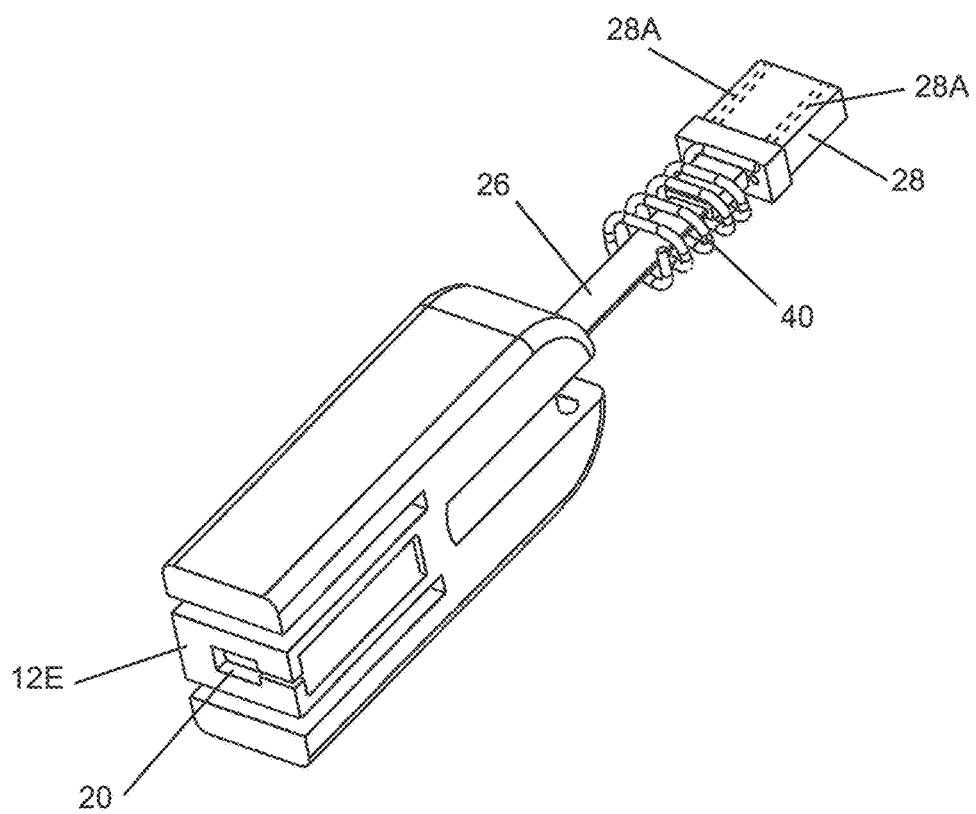
FIG. 3 is an exploded view of the MT connector used in the MT connector assembly showing a spring of the MT connector in accordance with one aspect of the present application.
Figure 4:
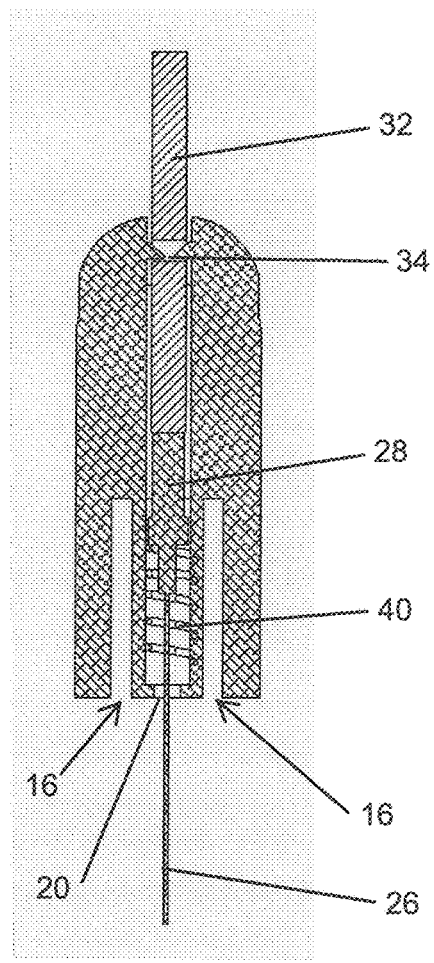
FIG. 4 is a cross-section top view of the MT connector assembly in accordance with one aspect of the present application.

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

The present disclosure relates to an MT connector assembly. The MT connector assembly may be used to secure a fiber optic ribbon to an Optical Waveguide Printed Circuit Board OWPCB. The MT connector assembly may prevent gaps to form between an MT termination and the OWPCB which may prevent optical transmission losses.

Referring to FIG. 1A-1C, an MT connector 10 of the MT connector assembly 30 (FIGS. 2A-2B) may be seen. The MT connector 10 may have a housing 12. In the present embodiment, the housing 12 may be shaped as a rectangular cuboid. However, this is shown as one embodiment and should not be seen in a limiting manner. The housing 12 may be formed in other shapes without departing from the spirit and scope of the present invention. A front surface 12A of the housing 12 may have rounded top and bottom edges 12B and 12C respectively.

A first slot 14 may be formed in the housing 12. The first slot 14 may be formed in the front surface 12A of the housing 12. The first slot 14 may be formed in a central area of the front surface 12A. The first slot 14 may extend across the width of the front surface 12A of the housing 12 and run approximately midway down a length of the housing 12. The first slot 14 may be planar and approximately parallel to a top surface 12D of the housing 12. The first slot 14 may be formed of a height sufficient to allow an OWPCB 32 (FIG. 2A-2B) to be inserted within the first slot 14.

A pair of slots 16 may be formed in a rear surface 12E of the housing. The pair of slots 16 may extend across the width of the rear surface 12E of the housing 12 and run approximately midway down a length of the housing 12. The pair of slots 16 may be planar and may be approximately parallel to one another and to the top surface 12D of the housing 12. A first one 16A of the pair of slots 16 may be formed in an upper area of the rear surface 12E. A second one 16B of the pair of slots 16 may be formed in a lower area of the rear surface 12E. Each of the pair of slots 16 may have a height less than the height of the first slot 14. By pressing the top surface 12D and the bottom surface 12F of the housing 12 near the rear surface 12E together, the pair of slots 16 may allow the rear area of the housing 12 to compress which may cause a front opening 14A of the first slot 14 to expand to increase the height of the first slot 14.

An aperture 18 may be formed through a side surface 12G of the housing 12. The aperture 18 may be positioned between the pair of slots 16 and extend completely through the housing 12 from the side surface 12G through to the side surface 12H. The aperture 18 may be formed near the rear surface 12E of the housing 12 and may have a length less than that each of the pair of slots 16.

An opening 20 (FIG. 3) may be formed in a central area of the rear surface 12E. The opening 20 is formed through the rear surface 12E and into the aperture 18. The opening 20 provides a passageway onto the aperture 18. The opening 20 may be sized to allow a fiberoptic ribbon cable 26 (FIGS. 2A-2B) to pass through and into the aperture 18. A slit 21 may be formed through one of the side surfaces 12G and/or 12H into the opening 20.

A channel 22 may be formed between the first slot 14 and the aperture 18. The channel 22 may connect the first slot 14 to the aperture 18. The channel 22 may be of a size to allow the fiberoptic ribbon cable 26 to pass through from the aperture 18 into the first slot 14.

Located within the first slot 14 is one or more securing pins 24. The securing pins 24 may be used to secure and hold the MT connector 10 to the OWPCB 32 (FIG. 2A-2B). The securing pin 24 may extend down from a top surface 14A of the first slot 14 and/or extend up from a bottom surface 14B of the first slot 14. In the embodiment shown, the MT connector 10 may have a top pair of securing pins 24 that extend down from a top surface 14A of the first slot 14 and a bottom pair of securing pins 24 extend up from a bottom surface 14B of the first slot 14. The top pair of securing pins 24 and the bottom pair of securing pins 24 may be aligned such that a corresponding securing pin 24 of the bottom pair of securing pins 24 is directly below a corresponding securing pin 24 of the top pair of securing pins 24. In accordance with one embodiment the securing pins 24 may be spring loaded.

FIGS. 2A-2B show the MT connector 10 being coupled to the OWPCB 32. The OWPCB 32 may have one or more alignment pins 34. The alignment pins 34 may extend out and away from the OWPCB 32. The alignment pins 34 may run approximately planar to a top and/or bottom surface 32A and 32B respectively of the OWPCB 32. The distal ends of the alignment pins 34 may engage corresponding alignment holes 28A (FIG. 3) in a ferrule 28 (FIG. 3) connected to an end of the fiberoptic ribbon cable 26. In the present embodiment, a pair of alignment pins 34 extend out and away from a side surface of the OWPCB 32.

The OWPCB 32 may have one or more notches 36 formed therein. The notches 36 may extend through the OWPCB 32. The number of notches 36 formed may be equal to the number of alignment pins 34. In the present embodiment, a pair of notches 36 may be formed. The pair of notches 36 may run parallel to one another. Each notch 36 may be used to contain and hold there within a corresponding alignment pin 34. Each notch 36 may be of a length to allow the corresponding alignment pin 34 to extend out and away from the OWPCB 32.

One or more retention holes 38 may be formed in the OWPCB 32. The retention holes 38 may be used to hold corresponding securing pins 24 thereby securing the MT connector 10 to the OWPCB 32. In accordance with one embodiment, the retention holes 38 may be formed through the OWPCB 32. In the present embodiment, since the top pair of securing pins 24 and the bottom pair of securing pins 24 may be aligned such that a corresponding securing pin 24 of the bottom pair of securing pins 24 is directly below a corresponding securing pin 24 of the top pair of securing pins 24, the retention holes 38 formed through the OWPCB 32 may engage and hold both the top pair of securing pins 24 and the bottom pair of securing pins 24 thereby securing the MT connector 10 to the OWPCB 32.

Referring to FIG. 3, the MT connector 10 may have a coil 40. The coil 40 may be positioned within the first slot 14. The coil 40 may be larger in size than the size of the channel 22. Thus, the coil 40 may press up against a rear area of the first slot 14 and may not slide into the channel 22.

Referring to FIGS. 1A-4, operation of the MT connector assembly 30 may be disclosed. The fiberoptic ribbon cable 26 may be positioned within the MT connector 10 such that fiberoptic ribbon cable 26 enters the front opening 14A of the first slot 14. The fiberoptic ribbon cable 26 passes through the channel 22 into the first slot 14 and out the opening 20.

A ferrule 28 on one end of the fiberoptic ribbon cable 26 may have alignment openings 28A. The alignment openings 28A may align with corresponding alignment pins 34 of the OWPCB 32. When the ferrule 28 is positioned such that the alignment pins 34 slide into the corresponding alignment openings 28A, the fiberoptic ribbon cable 26 may be aligned with optical waveguides formed on the OWPCB 32.

The ferrule 28 may engage the coil 40 positioned within the first slot 14. A rear surface 28A of the ferrule 28 may be larger than a dimeter of the coil 40 thereby causing the coil 40 to press up against the rear surface of the ferrule 28.

A user may press the top surface 12D and the bottom surface 12F of the housing 12 near the rear surface 12E together, the pair of slots 16 may allow the rear area of the housing 12 to compress which may cause a front opening 14A of the first slot 14 to expand to increase the height of the first slot 14.

The user may then move the MT connector 10 along the OWPCB 32 so that the securing pins 24 do not contact and damage the OWPCB 32. The user may align the securing pins 34 of the MT connector 10 with a corresponding retention holes 38 formed in the OWPCB 32. When the user stops pressing the top surface 12D and the bottom surface 12F of the housing 12, the front opening 14A of the first slot 14 returns to its original non-expanded state. The alignment pins 34 may fall into corresponding retention holes 38 thereby securing the MT connector 10 to the OWPCB 32.

With the MT connector 10 secured to the OWPCB 32, the coil 40 may exert pressure against the rear surface 28A of the ferrule 28 and the rear surface of the first slot 14. The pressure exerted may keep the ferrule 28 flush with the OWPCB 32 thereby preventing gaps from forming. The pressure exerted may keep the ferrule 28 properly aligned. Thus, the pressure exerted by the coil 40 helps to prevent optical transmission losses in the MT connector assembly 30.

The foregoing description is illustrative of particular embodiments of the application, but is not meant to be a limitation upon the practice thereof. The following claims, including all equivalents thereof, are intended to define the scope of the application.

What is claimed is:

1. A fiber optic connector assembly comprising:
   an MT connector, the MT connector comprising:
   a housing;
   a first slot formed in a front surface of the housing, the first slot extending across a width of the front surface of the housing and partially down a length of the housing;
   a pair of slots formed in a rear surface of the housing, the pair of slots extending across a width of the rear surface of the housing and partially down the length of the housing;
   an aperture formed through a side surface of the housing and between the pair of slots, the aperture extending completely through the housing;
   an opening formed in a central area of the rear surface of the housing and in communication with the aperture;
   a channel formed between the first slot and the aperture connecting the first slot to the aperture; and
   at least one securing pin formed within the first slot.

2. The fiber optic connector assembly in accordance with claim 1, comprising a coil positioned within the first slot.

3. The fiber optic connector assembly in accordance with claim 1, wherein the first slot is formed in a central area of the front surface and extends midway down the length of the housing, the first slot planar with a top surface of the housing.

4. The fiber optic connector assembly in accordance with claim 1, wherein the pair of slots extend midway down the length of the housing and are planar to a top surface of the housing, one slot of the pair of slots formed in an upper area of the rear surface of the housing and another slot of the pair of slots formed in a lower area of the rear surface housing.

5. The fiber optic connector assembly in accordance with claim 4, wherein the one slot of the pair of slots and the another slot of the pair of slots each have a height less than that of the first slot.

6. The fiber optic connector assembly in accordance with claim 1, wherein the aperture has a length less than that each of the pair of slots.

7. The fiber optic connector assembly in accordance with claim 1, wherein the at least one securing pin comprises a top pair of securing pins extending down from a top surface of the first slot.

8. The fiber optic connector assembly in accordance with claim 7, wherein the at least one securing pin comprises a bottom pair of securing pins extending up from a bottom surface of the first slot, the top pair of securing pins and the bottom pair of securing pins aligned such that a corresponding securing pin of the bottom pair of securing pins is directly below a corresponding securing pin of the top pair of securing pins.

9. The fiber optic connector assembly in accordance with claim 1, comprising:
an Optical Waveguide Printed Circuit Board (OWPCB);
at least one alignment pin extending out from the OWPCB aligning a ferrule with the OWPCB; and
at least one retention hole configured to receive the at least one securing pin.

10. The fiber optic connector assembly in accordance with claim 9, comprising at least one notch formed in the OWPCB to contain and hold there within the at least one alignment pin.

11. A fiber optic connector assembly comprising:
an MT connector, the MT connector comprising:
a housing;
a first slot formed in a front surface of the housing, the first slot extending across a width of the front surface of the housing and extends midway down the length of the housing, the first slot planar with a top surface of the housing;
a pair of slots formed in a rear surface of the housing, the pair of slots extending across a width of the rear surface of the housing and partially down the length of the housing;
an aperture formed through a side surface of the housing and between the pair of slots, the aperture extending completely through the housing;
an opening formed in a central area of the rear surface and in communication with the aperture;
a channel formed between the first slot and the aperture connecting the first slot to the aperture;
a first pair of securing pins extending down from a top surface of the first slot; and
a second pair of securing pins extending up from a bottom surface of the first slot, wherein the first pair of securing pins and the second pair of securing pins are aligned such that a corresponding securing pin of the second pair of securing pins is directly below a corresponding securing pin of the first pair of securing pins.

12. The fiber optic connector assembly in accordance with claim 11, comprising a coil positioned within the first slot.

13. The fiber optic connector assembly in accordance with claim 11, wherein the pair of slots extend midway down the length of the housing and are planar to a top surface of the housing, one slot of the pair of slots formed in an upper area of the rear surface of the housing and another slot of the pair of slots formed in a lower area of the rear surface housing.

14. The fiber optic connector assembly in accordance with claim 13, wherein the one slot of the pair of slots and the another slot of the pair of slots each have a height less than that of the first slot.

15. The fiber optic connector assembly in accordance with claim 11, wherein the aperture has a length less than that each of the pair of slots.

16. The fiber optic connector assembly in accordance with claim 11, comprising:
an Optical Waveguide Printed Circuit Board (OWPCB);
a pair of alignment pins extending out from the OWPCB aligning a ferrule with the OWPCB; and
a pair of retention holes formed through the OWPCB, the pair of retention holes configured to receive the first pair of securing pins and the second pair of securing pins.

17. The fiber optic connector assembly in accordance with claim 16, comprising a pair of notches formed in the OWPCB, each of the pair of notches holding there within one of the pair of alignment pins.

18. A fiber optic connector assembly comprising:
an MT connector, the MT connector comprising:
a housing;
a first slot formed in a front surface of the housing, the first slot extending across a width of the front surface of the housing and extends midway down the length of the housing, the first slot planar with a top surface of the housing;
a pair of slots formed in a rear surface of the housing, the pair of slots extending across a width of the rear surface of the housing and partially down the length of the housing, wherein the pair of slots extend midway down the length of the housing and are planar to a top surface of the housing, one slot of the pair of slots formed in an upper area of the rear surface of the housing and another slot of the pair of slots formed in a lower area of the rear surface housing;
an aperture formed through a side surface of the housing and between the pair of slots, the aperture extending completely through the housing;
an opening formed in a central area of the rear surface of the housing and in communication with the aperture;
a channel formed between the first slot and the aperture connecting the first slot to the aperture;
a coil positioned within the first slot, the coil having a diameter larger than a perimeter of the opening;
a first pair of securing pins extending down from a top surface of the first slot; and
a second pair of securing pins extending up from a bottom surface of the first slot, wherein the first pair of securing pins and the second pair of securing pins are aligned such that a corresponding securing pin of the second pair of securing pins is directly below a corresponding securing pin of the first pair of securing pins.

19. The fiber optic connector assembly in accordance with claim 18, comprising:
an Optical Waveguide Printed Circuit Board (OWPCB);
a pair of alignment pins extending out from the OWPCB aligning a ferrule with the OWPCB;
a pair of notches formed in the OWPCB, each of the pair of notches holding there within one of the pair of alignment pins; and
a pair of retention holes formed through the OWPCB, the pair of retention holes configured to receive the first pair of securing pins and the second pair of securing pins.

* * * * *